Patented Sept. 22, 1953

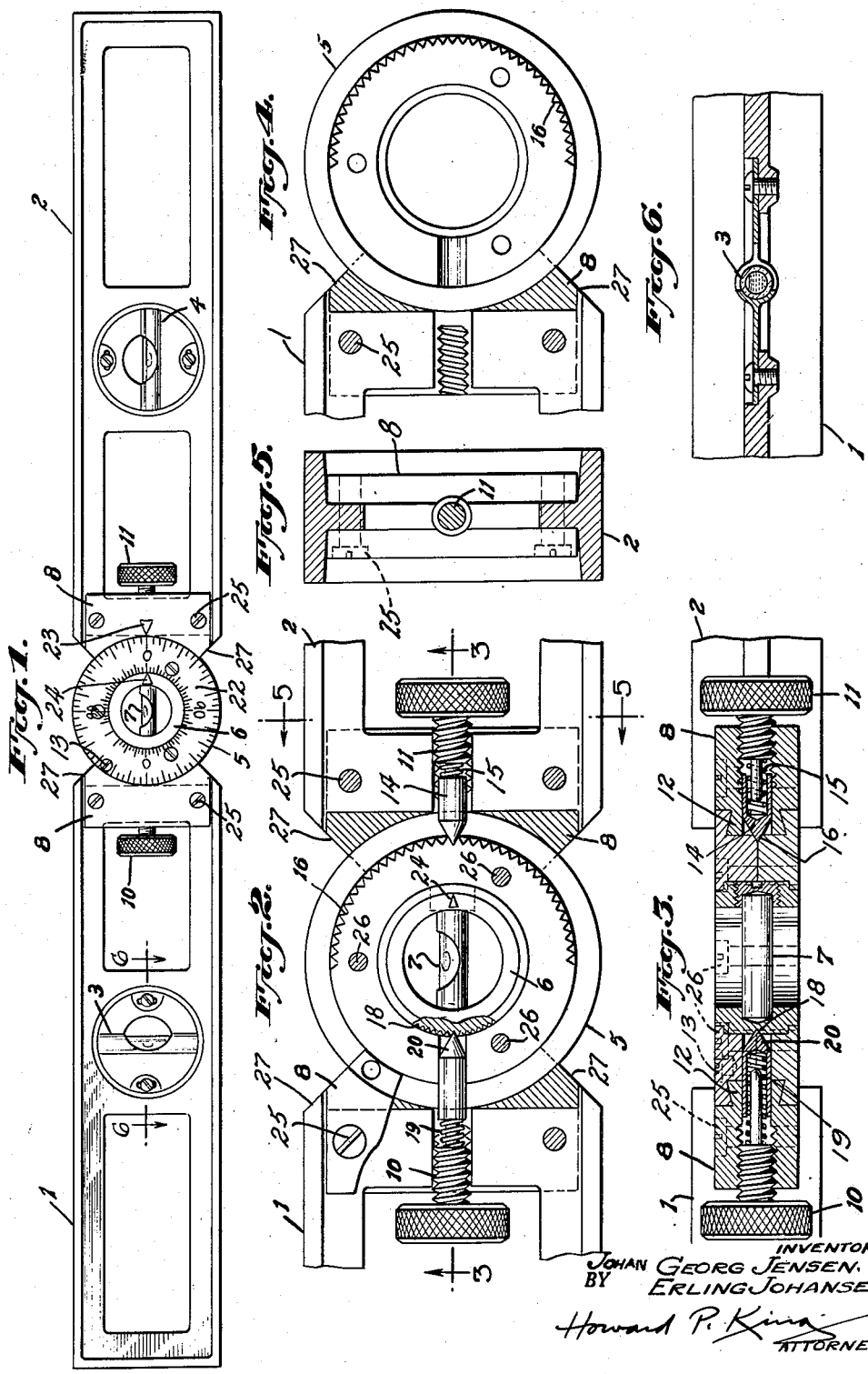

2,652,628

UNITED STATES PATENT OFFICE 2,652,628

COMBINED LEVEL AND SQUARE

Johan Georg Jensen and Erling Johansen, Kristiansand, Norway

Application December 15, 1949, Serial No. 133,086
In Norway August 24, 1949

5 Claims. (Cl. 33—89)

1

This invention relates to a combined level and square, and particularly to such combination wherein parts of the level are hinged and adapted to be rotated to a desired angular relation for squaring and beveling purposes.

An object of the invention is to provide an improved combined instrument of the character indicated.

More specifically, an object of the invention is to provide such an instrument which will be accurate either as a level or as a square.

Structurally considered, the invention contemplates provision of a hinge connection between the swinging or folding parts of the instrument of a character that will prevent wobble or other play.

Another object of the invention is to provide for an adjustable leveling tube.

A further object is to provide for angular adjustment of the instrument sections or parts and to also enable the adjustable level tube to be additionally adjusted.

Still further objects of the invention are to provide an instrument of the character indicated which is readily operated and its adjustments easily understood; to provide a structure within the usual dimensions of the commonly used level; to minimize the number of differently formed parts, using duplicate parts instead, where possible; and to otherwise obtain simplicity of construction and reduce manufacturing costs.

Other objects and advantages will appear to those skilled in the art to which the invention appertains, both by direct reference thereto as the description proceeds and by implication from the context.

Referring to the accompanying drawing, in which like numerals of reference indicate similar parts throughout the several views:

Fig. 1 is a side elevation of an instrument of the character indicated, showing the same extended in its form or condition comprising a level;

Fig. 2 is a similar view of the hinge portion of the instrument, on larger scale than Fig. 1, and with portions broken away and portions in section;

Fig. 3 is a sectional view on line 3—3 of Fig 2;

Fig. 4 is a view of a portion of the structure shown in Fig. 2, and particularly showing the

2 parts of the instrument which have fixed relation to the level section at the left of Figs. 1 and 2.

Fig. 5 is a cross-sectional view on line 5—5 of Fig. 2; and

Fig. 6 is a sectional view on line 6—6 of Fig. 1.

In the specific embodiment of the invention illustrated in said drawing, the reference numerals 1 and 2 designate body sections of the instrument, said sections each constituting substantially half of the length of the level, and when the device is utilized as a square, or bevel gauge, said sections constituting the two arms of the square or bevel gauge. It is to be noted that the said sections may be swung at varying angles, either way from the straight position indicated, to a minimum of 90° and can be held at any desired angle between 180° and 90°, so that its limiting positions are either as a level or a square but adapted to constitute a bevel gauge for intermediate angles. For brevity, the instrument is conveniently referred to as a level and square, but with the understanding the term includes use thereof for intermediate angles for which it is adapted.

The body sections 1 and 2 are of the commonly employed edge-flange and hollow web construction for levels, and about the middle of each are provided level tubes, of which tube 3 is positioned cross-wise of the section for indicating verticals and tube 4 is positioned longitudinally of the section for indicating horizontals.

At the middle of the level, at what may be termed the inner ends of the sections 1 and 2, is a ring 5, the axial center of which is transverse to the vertical plane of the level when considering the level as standing on one longitudinal edge on a horizontal surface. Said ring 5 is fixed with respect to one section, for instance, section 1, and the other section 2 is arranged to revolve, within the limits above prescribed, upon said ring and in effect as if said section 2 were pivoted on the axis of said ring.

Within said ring 5, which may now be further designated as the outer ring, is a smaller or inner ring 6 which is held rotatably within the outer ring and carries a level tube 7, whereby said tube is adjustable to any leveling position desired with respect to either section 1 or 2.

For purposes of mounting the outer ring 5 with respect to the sections 1 and 2, mounting heads 8 are provided at the inner ends of both sections, and to simplify manufacture, said heads may be substantially identical in construction, each providing an arcuate dove-tail rib 12 toward the ring and engaged within a similarly shaped peripheral groove formed in said ring. A set-screw 13 through one face of the ring at said groove, bears against said dove-tail rib thereby retaining said ring from rotation with respect to the head 8 of section 1.

A means, here shown as including a thumb screw 10, is provided in the fixed section 1 for locking the adjustable inner ring 6 and level tube 7 in desired position, and a similar thumb screw 11 is provided in the revolvable section 2 for locking that section with respect to the ring in its desired position. Said screw 11 is threaded in the head 8 of section 2 and projects toward the center of the ring. A hollow and pointed detent 14 is provided between the end of the screw and the ring and pressure applied by the screw is communicated to the said detent through an interposed spring 15. The bottom of the dove-tail groove of the ring is provided with a series of saw-tooth or other notches 16 into any one of which the point of said detent may seat. Accordingly, by appropriate manipulation of screw 11, the detent may be released when desired and the section 1 revolved on the ring and then held in its new position by reverse manipulation of said screw to forcibly seat the detent in another notch 16. Adjusted locking of the inner ring 6 is similarly obtained by a peripheral series of notches 18 thereon which are engageable under pressure of thumb screw 10 and intervening spring 19 by a hollow pointed detent 20 projecting radially through the outer ring 5 to said inner ring 6.

A dial plate 22 is shown secured to a face of the outer ring, said dial plate having an annular series of gauge markings thereon next its outer periphery and another series next its inner periphery. A pointer 23 on the head 8 of instrument section 2 cooperates with the outer series of markings to show the angular disposition of the said section to the other section 1, and a pointer 24 on the inner ring next the inner series of markings will indicate the angular disposition of the level tube 7 with respect to said section 1.

It may be here pointed out that according to the present showing, the heads 8 at the inner ends of sections 1 and 2 are constructed separate from and attached to said sections 1 and 2 by the provision of flanges on heads 8 which overlap end webs of the sections 1 and 2, in the nature of a mortise and tenon connection, the heads being retained by screws 25 transversely through said connection, but this construction is subject to variation as may be desired by the manufacturer.

A further detail shown, but also subject to variation, is in making the outer ring in two parts separable on a medial plane perpendicular to the axis of said ring and the two parts held together by screws 26. The purpose of this construction is to enable the peripheral dove-tail groove to conveniently receive the dove-tail ribs of the heads 8. The dove-tail connection retains the heads inseparably mounted on the ring, and yet will permit section 2 to be revolved on said ring.

Finally, it is to be observed that the inner ends of the sections 1 and 2, and of the heads 8, are chamfered at 45° angles to the top and bottom edges of the sections, as at 27, and on planes passing through or containing the center axis of the ring. In consequence of this construction, when one section is swung to right angles with respect to the other, chamfered ends of the two sections will meet and thus obtain an accurate right-angular relationship of the sections for constituting the instrument a perfect square. Ring 5 is at all times within the planes of the upper and lower edge faces of the sections and will not interfere with the use of the instrument either as a level or a square in engagement of the instrument with plane surfaces either horizontally or at angles corresponding to angular setting of the level sections.

We claim:

1. An instrument of the character described comprising two sections having inner ends toward each other, a ring between said sections, said sections being carried by said ring and one section revolvable on said ring, and a second ring within the first mentioned ring, said second ring being rotatable within the said first mentioned ring, and a level tube mounted in the said second ring and adapted to be aligned with either of said sections with said sections in any angle of rotation with respect to each other.

2. An instrument of the character described comprising two sections adapted to be alined for constituting a level, said sections having inner ends toward each other, a ring interposed between and supporting said sections, one said section being revolvable upon said ring, and said inner ends of the sections being chamfered at said inner ends with the chamfers constituting stops for limiting the rotation of one section with respect to the other and permitting 180° rotation from one stop to the other, and a rotatably adjustable level tube within said ring and thereby adapting the level tube to be aligned with either section.

3. An instrument of the character described comprising two sections having inner ends toward each other, a ring between said sections, said sections being carried by said ring and one section being fixed on the ring and the other revolvable on the ring, a second ring within the first-mentioned ring, said second ring being rotatable within the first mentioned ring, means on the fixed section extending to said inner ring for adjustably retaining said inner ring in desired rotational position, and means on the revolvable section for adjustably retaining that section in desired rotational position with respect to the said first mentioned ring.

4. An instrument of the character described comprising two sections having inner ends toward each other, a ring between said sections, said sections being carried by said ring and one section revolvable on said ring, a second ring within the first mentioned ring, said second ring being rotatable within the first mentioned ring, a level tube mounted in the said second ring and thereby adapted to be aligned with either of said sections with said sections in any angle of rotation with respect to each other, and one of said sections having a level tube for levelling that section and for comparative levelling of the revolvable level tube therewith.

5. An instrument of the character described comprising two sections having inner ends toward each other, a ring between said sections, said sections being carried by said ring and one section revolvable on said ring, a second ring within the first mentioned ring, said second ring being rotatable within the first mentioned ring, a level tube mounted in the said second ring and revolvable by rotation of said second ring and thereby adapted to be aligned with either of said sections with said sections in any angle of rotation with respect to each other, and both of said sections having level tubes for levelling the respective sections and for selective comparative levelling of the revolvable level tube therewith.

JOHAN GEORG JENSEN.
ERLING JOHANSEN.

References Cited in the file of this patent

UNITED STATES PATENTS

| Number | Name | Date |
|---|---|---|
| 104,577 | Goodes | June 21, 1870 |
| 383,375 | Short | May 22, 1888 |
| 1,086,545 | Meister et al. | Feb. 10, 1914 |
| 1,118,907 | Nordlie | Nov. 24, 1914 |
| 1,141,617 | Creamer | June 1, 1915 |
| 1,143,256 | Dewees | June 15, 1915 |
| 1,414,033 | Mahon | Apr. 25, 1922 |
| 1,594,097 | Histand | July 27, 1926 |
| 1,637,933 | Galvin | Aug. 2, 1927 |
| 1,982,178 | Rudolff | Nov. 27, 1934 |